Figure 5:
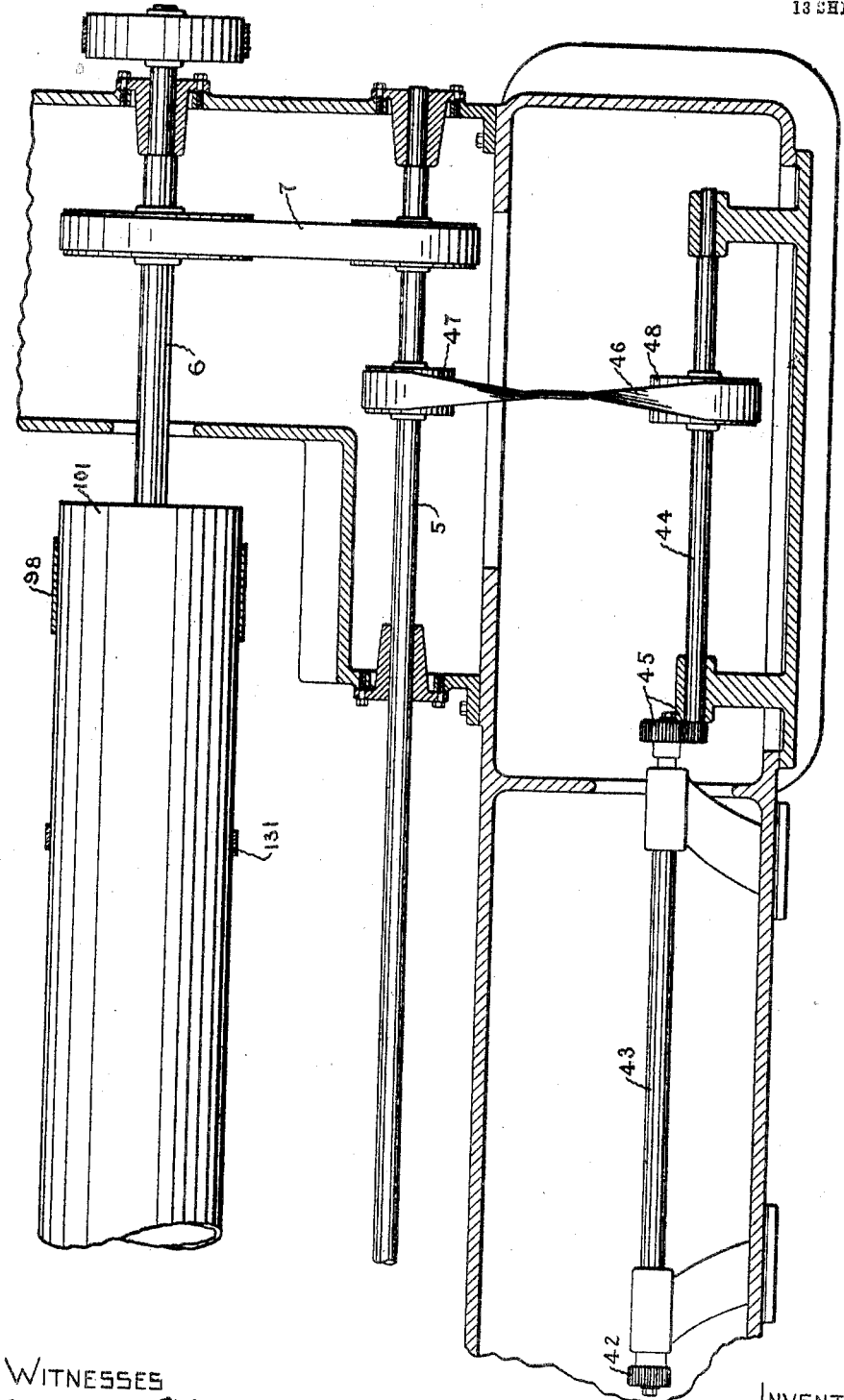

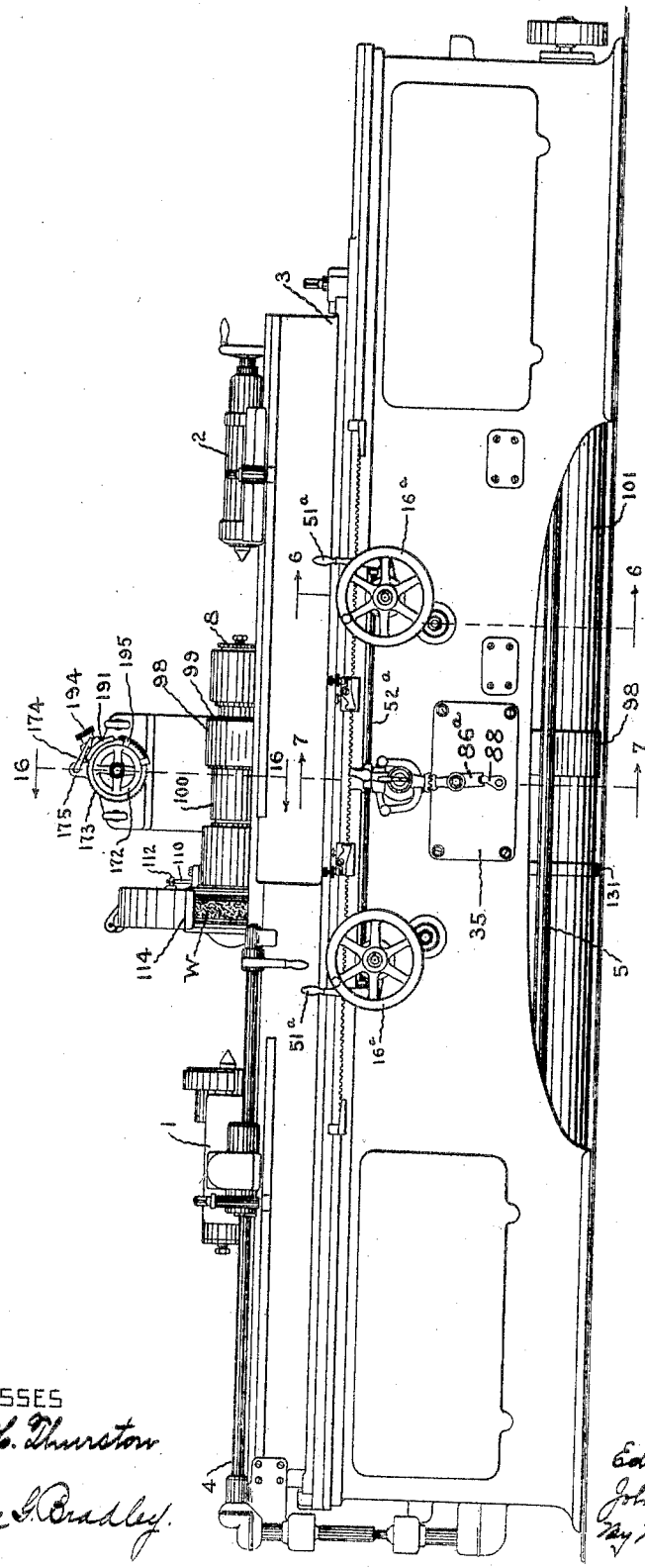

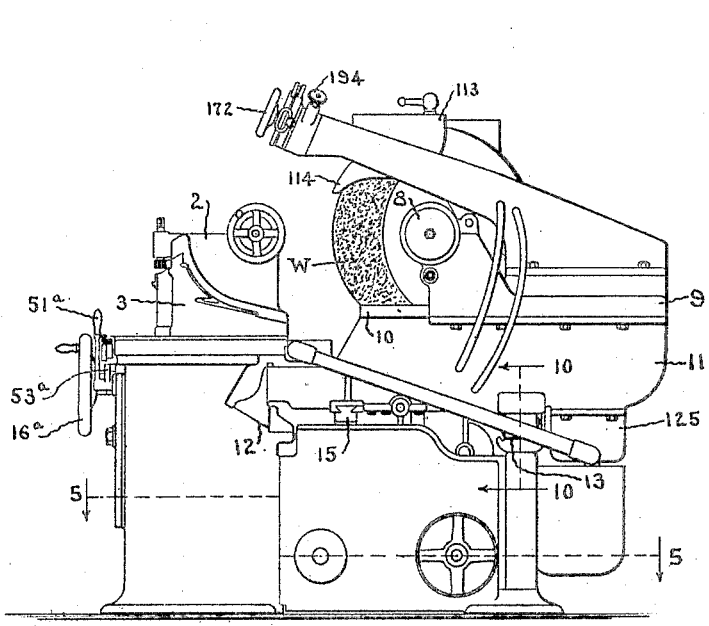

No. 797,216. PATENTED AUG. 15, 1905.
E. H. PARKS & J. J. THACHER.
GRINDING MACHINE.
APPLICATION FILED JAN. 3, 1905.

13 SHEETS—SHEET 3.

WITNESSES
James H. Thurston
Catherine G. Bradley

INVENTORS
Edward H. Parks
John J. Thacher
by Wilmarth H. Thurston, Attorney

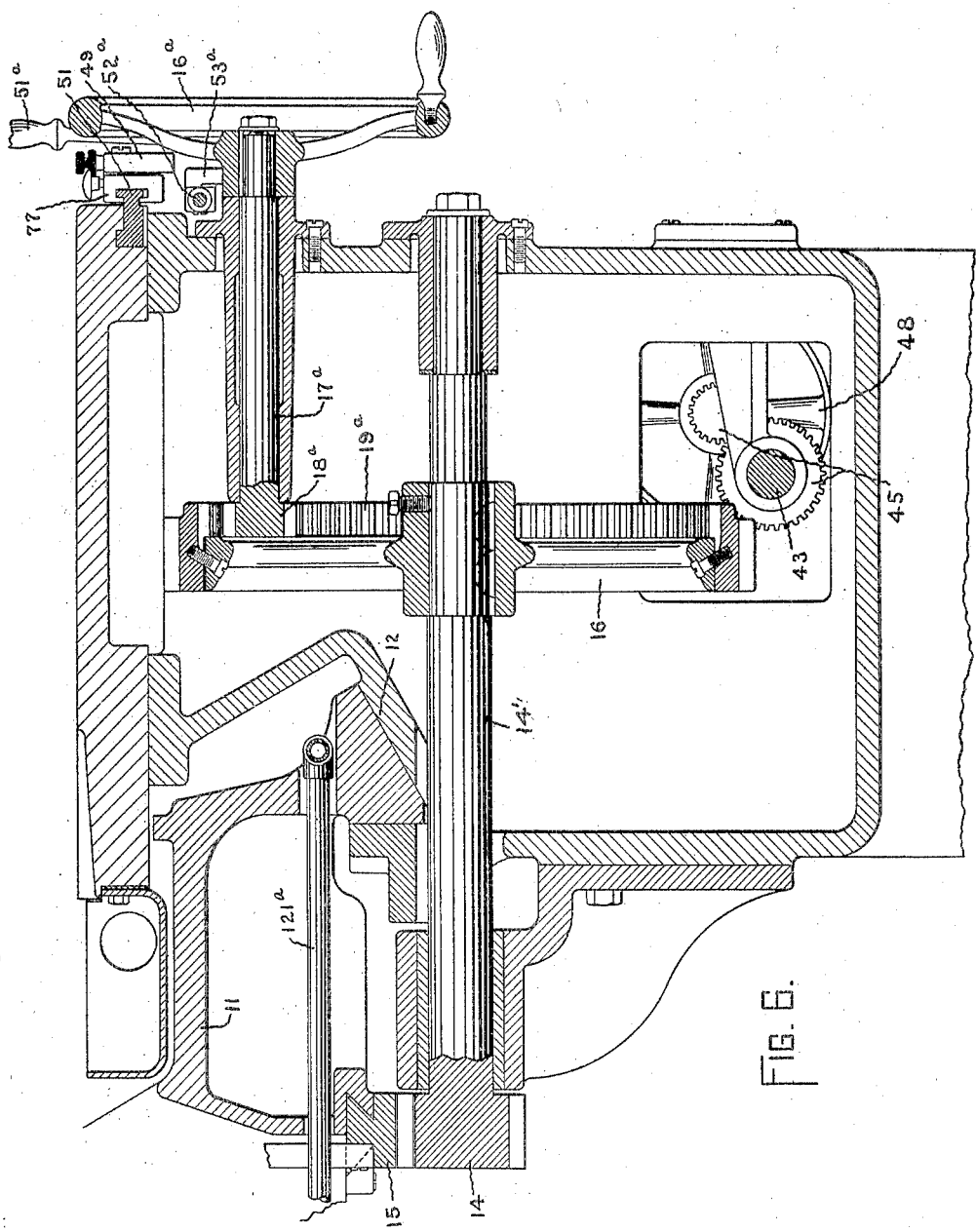

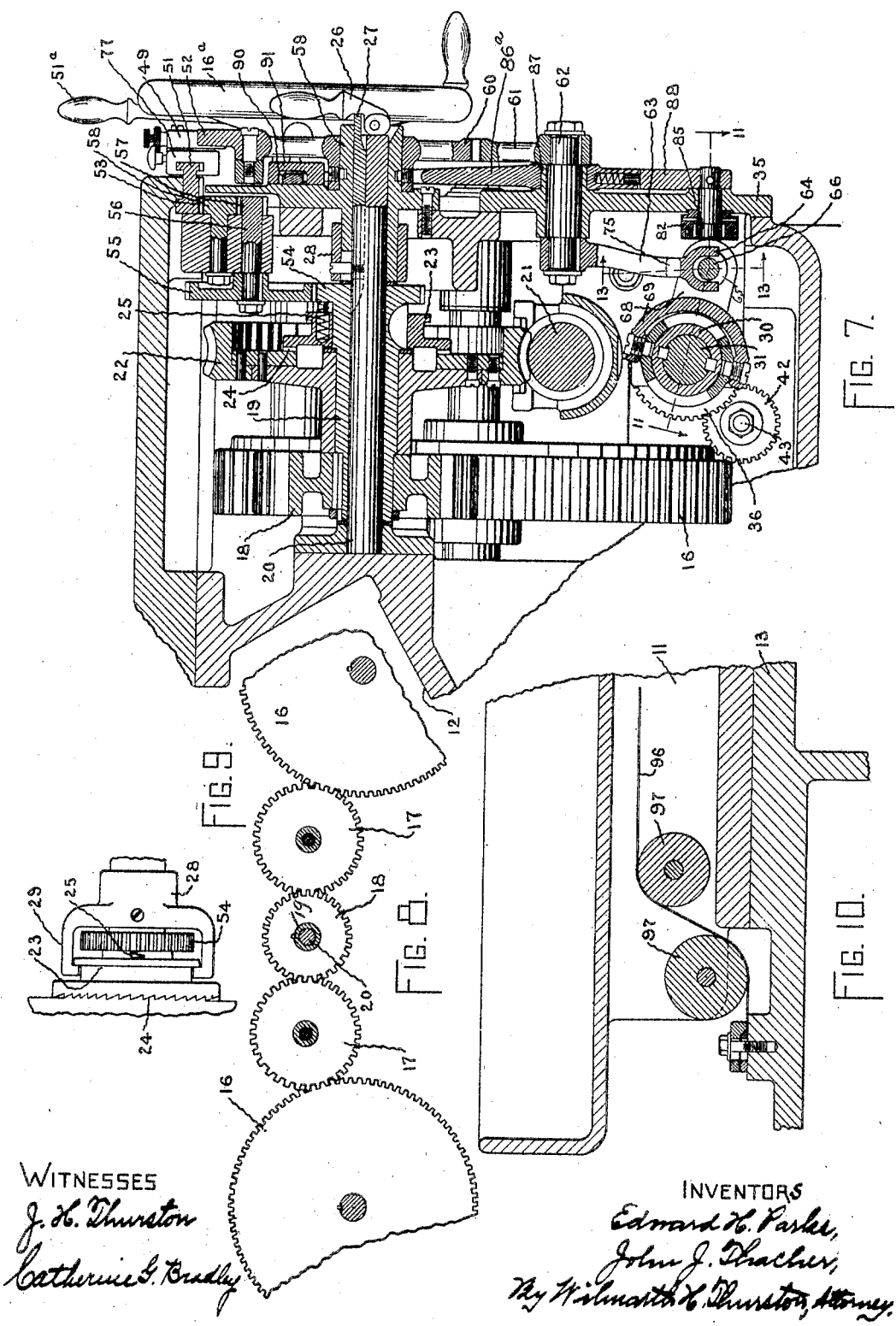

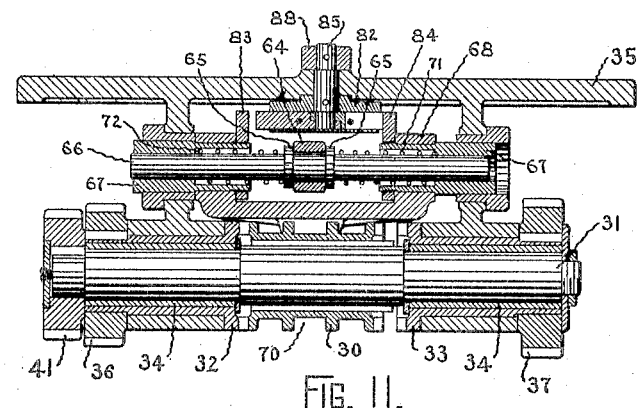

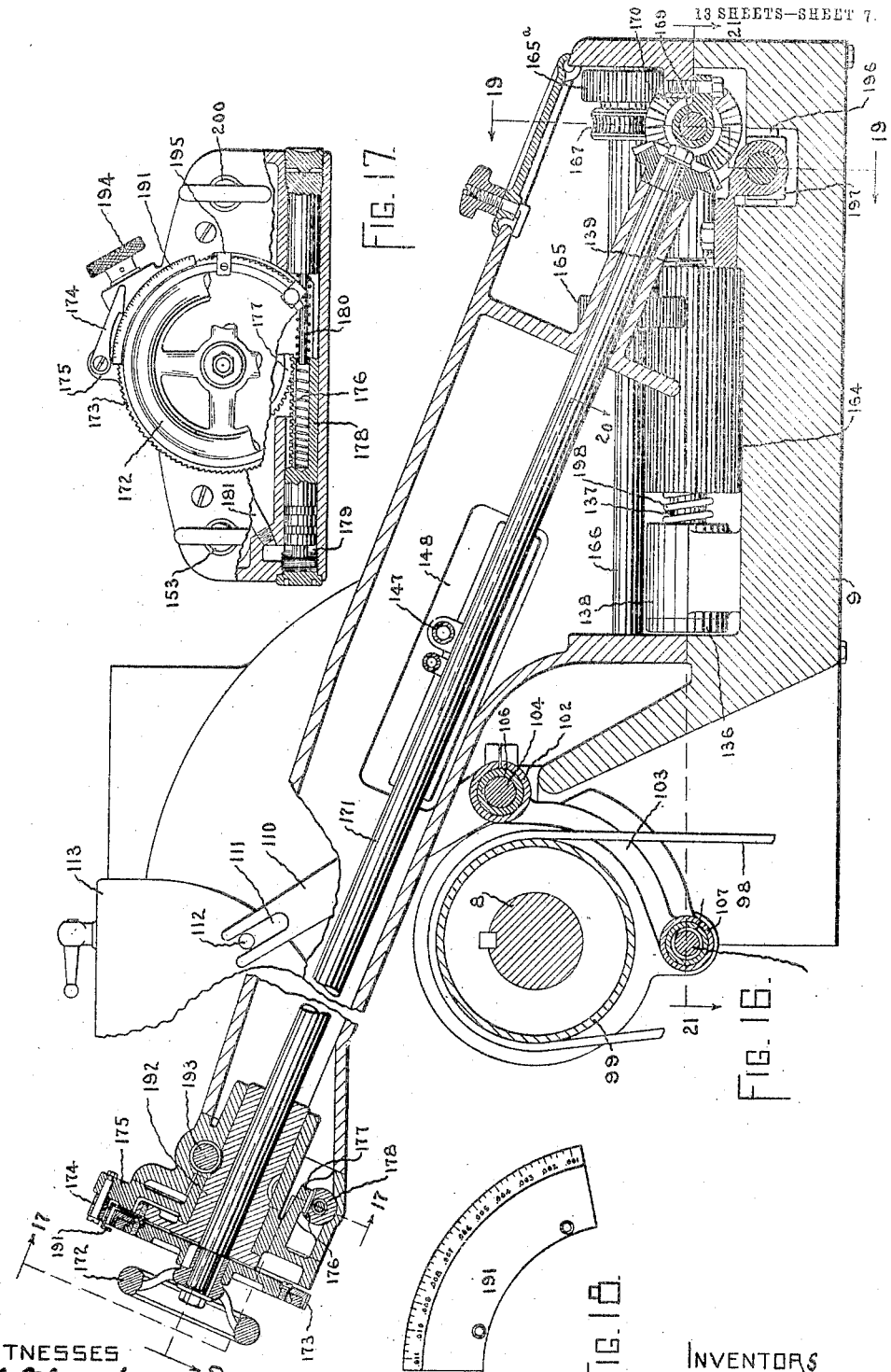

No. 797,216. PATENTED AUG. 15, 1905.
E. H. PARKS & J. J. THACHER.
GRINDING MACHINE.
APPLICATION FILED JAN. 3, 1905.

13 SHEETS—SHEET 9.

WITNESSES
James H. Thurston
Catherine G. Bradley

INVENTORS
Edward H. Parks
John J. Thacher,
By Wilmarth H. Thurston, Attorney.

No. 797,216. PATENTED AUG. 15, 1905.
E. H. PARKS & J. J. THACHER.
GRINDING MACHINE.
APPLICATION FILED JAN. 3, 1905.

13 SHEETS—SHEET 10.

FIG. 27.ª

WITNESSES
James H. Thurston
Catherine G. Bradley

INVENTORS
Edward H. Parks,
John J. Thacher,
By Wilmarth H. Thurston, Attorney.

No. 797,216. PATENTED AUG. 15, 1905.
E. H. PARKS & J. J. THACHER.
GRINDING MACHINE.
APPLICATION FILED JAN. 3, 1905.

13 SHEETS—SHEET 11.

WITNESSES
James H. Thurston
Catherine G. Bradley

INVENTORS
Edward H. Parks
John J. Thacher
By Wilmarth H. Thurston, Atty.

No. 797,216. PATENTED AUG. 15, 1905.
E. H. PARKS & J. J. THACHER.
GRINDING MACHINE.
APPLICATION FILED JAN. 3, 1905.
13 SHEETS—SHEET 12.
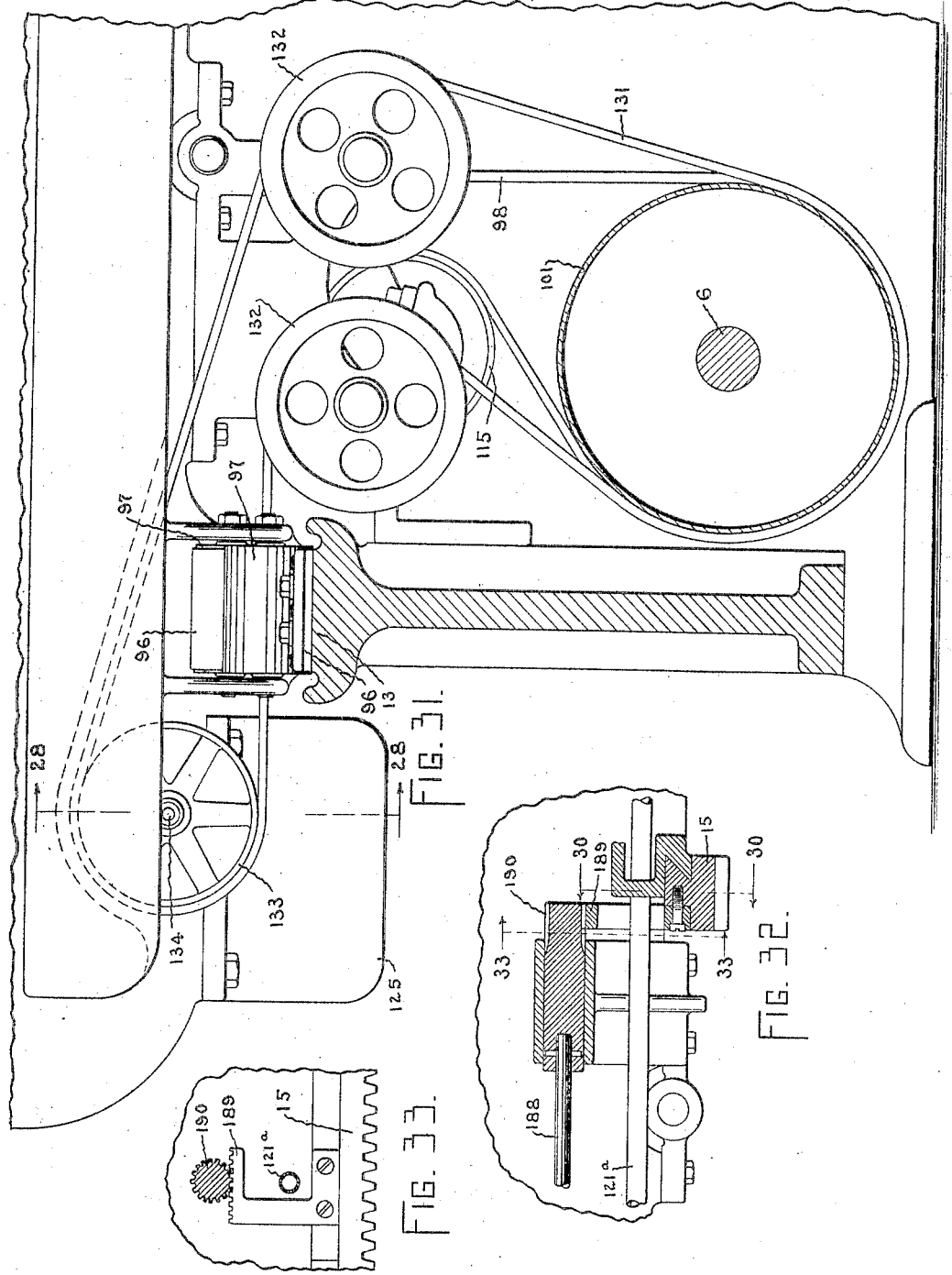

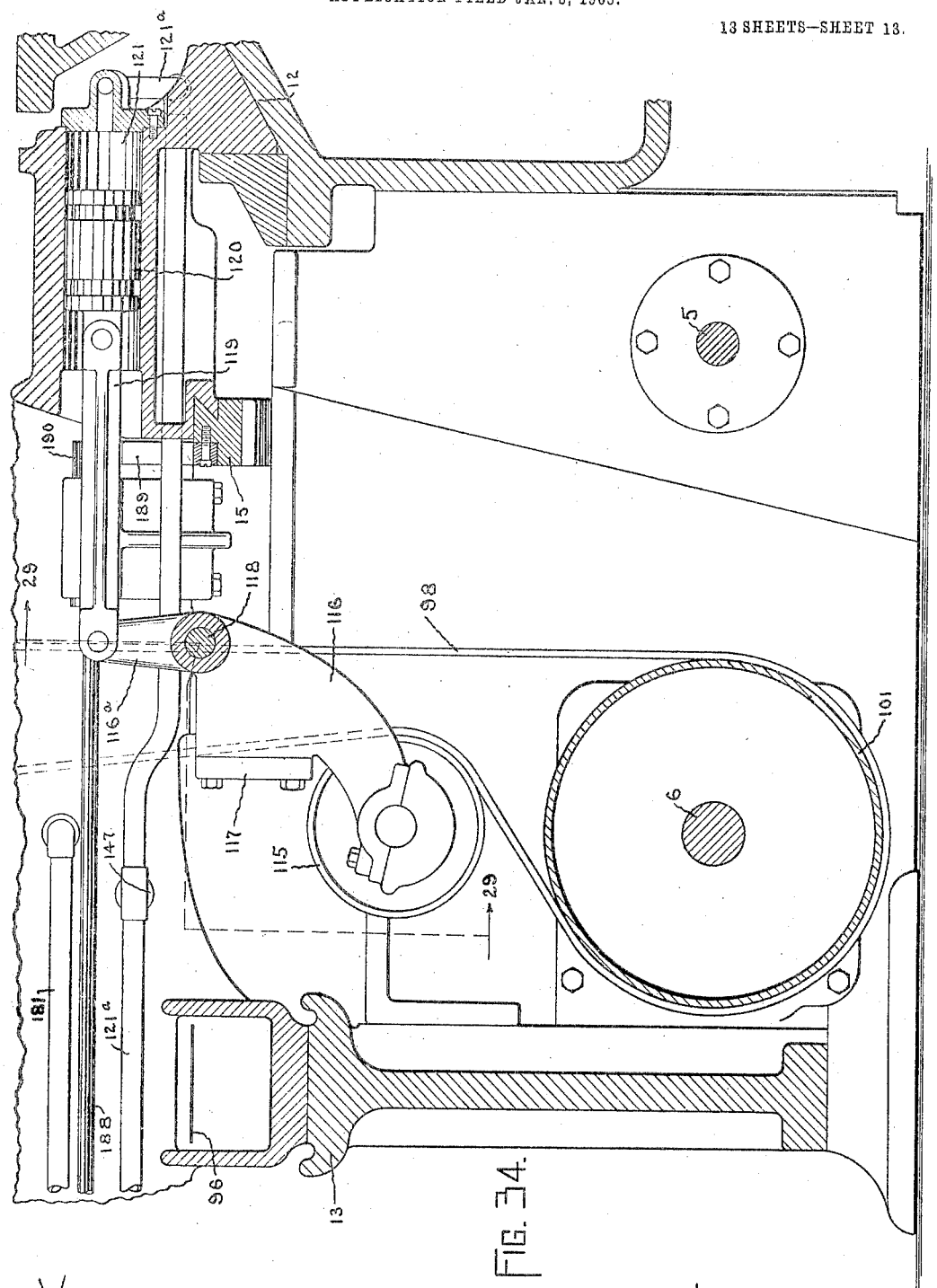

UNITED STATES PATENT OFFICE.

EDWARD H. PARKS, OF PROVIDENCE, RHODE ISLAND, AND JOHN J. THACHER, OF ATTLEBORO, MASSACHUSETTS, ASSIGNORS TO BROWN AND SHARPE MANUFACTURING COMPANY, OF PROVIDENCE, RHODE ISLAND, A CORPORATION OF RHODE ISLAND.

GRINDING-MACHINE.

No. 797,216.      Specification of Letters Patent.      Patented Aug. 15, 1905.

Application filed January 3, 1905. Serial No. 239,448.

*To all whom it may concern:*

Be it known that we, EDWARD H. PARKS, of the city and county of Providence and State of Rhode Island, and JOHN J. THACHER, of Attleboro, in the county of Bristol and State of Massachusetts, have invented certain new and useful Improvements in Grinding-Machines; and we do hereby declare the following specification, taken in connection with the accompanying drawings, forming a part of the same, to be a full, clear, and exact description thereof.

The invention relates to grinding-machines of the type employed for grinding shafts or other cylindrical or tapered work in which the work is supported upon centers and continuously revolved while being acted upon by a grinding-wheel, either the work or the grinding-wheel being reciprocated so that the wheel acts progressively along the work.

In this class of machines it is frequently desirable to stop the reciprocating carriage upon which either the work or the grinding-wheel is mounted at one end of its stroke for the purpose of calipering the work or for removing finished work and introducing a new piece.

One feature of the invention consists in providing means which may be set at any time during the operation of the machine and which when thus set will cause the reciprocating carriage to stop and remain at rest when it reaches the end of its travel in the direction in which it happens to be moving at the time the stopping means is set. By means of this device the operator may at any time during the travel of the carriage provide for the stopping of the reciprocating carriage when the work and grinding-wheel are next brought into such relation that the wheel is beyond the end of the work.

In this class of machines the grinding-wheel is mounted upon a cross-slide, which is advanced or fed forward after each stroke of the reciprocating carriage in order to bring the wheel into position to take a new cut.

Certain features of the invention relate to the means for insuring an accurate and uniform positioning of the cross-slide in making successive cuts and in grinding duplicate pieces of work. For this purpose the cross-slide is positioned or its feed controlled by a stop against which the slide or a part fixed thereto is continually pressed during the operation of the grinding-wheel upon the work. In order that the slide may be forced against the stop with a uniform pressure and a resulting increase in the accuracy with which the slide is positioned, a fluid which is under constant pressure is employed for keeping the slide up to the stop.

It is frequently desirable to move the grinding-wheel back away from the work—as, for instance, in order to caliper the work at a certain point and to thereafter return the grinding-wheel accurately to position to continue to cut. To enable this to be done, means are provided which are under the control of the operator for moving the cross-feed slide back away from the positioning-stop and returning it to position against the stop.

These features of invention, as well as numerous other features which will be set forth in the claims, will be understood from a detailed description of the machine in which we have embodied them and which illustrates all the various features of the invention in the forms in which we prefer to use them.

This machine is shown in the accompanying drawings, in which—

Figure 1 is a front elevation of the machine. Fig. 2 is a right-hand end elevation. Fig. 3 is an enlarged detail of parts shown in Fig. 1. Fig. 4 is a sectional detail on line 4 4, Fig. 3. Fig. 5 is a horizontal sectional view on line 5 5, Fig. 2. Fig. 6 is a transverse sectional view on line 6 6, Fig. 1. Fig. 7 is a transverse sectional view on line 7 7, Fig. 1. Fig. 8 is a detail showing the part of the gearing for operating the reciprocating carriage. Fig. 9 is a detail showing the parts for operating the clutch for throwing the carriage-operating mechanism into and out of operation. Fig. 10 is a detail section on line 10 10, Fig. 2, showing the guard for the rear way of the reciprocating carriage. Fig. 11 is a detail section on line 11 11, Fig. 7. Fig. 12 is a detail elevation of the reversing mechanism, parts being shown in section. Fig. 13 is a sectional elevation on line 13 13, Fig. 7. Figs. 14 and 15 are details of the carriage-stopping mechanism, showing the parts in active and inactive position. Fig. 16 is a transverse sectional view on line 16 16, Fig.

Figure 19:
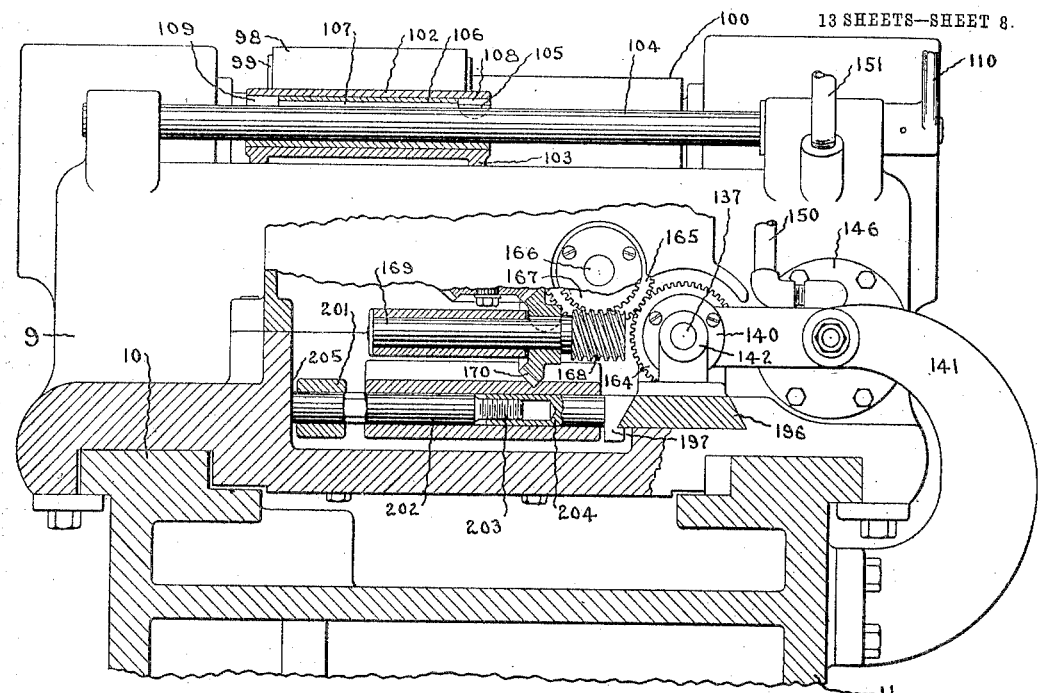
Figure 20:
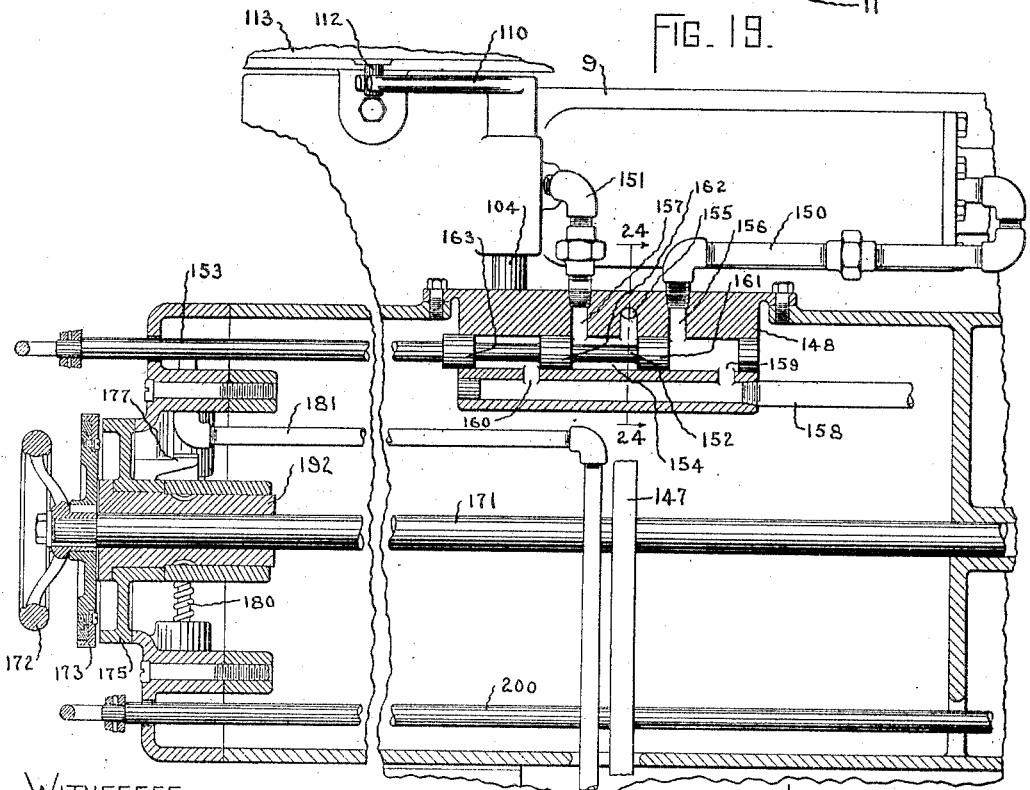
Figure 21:
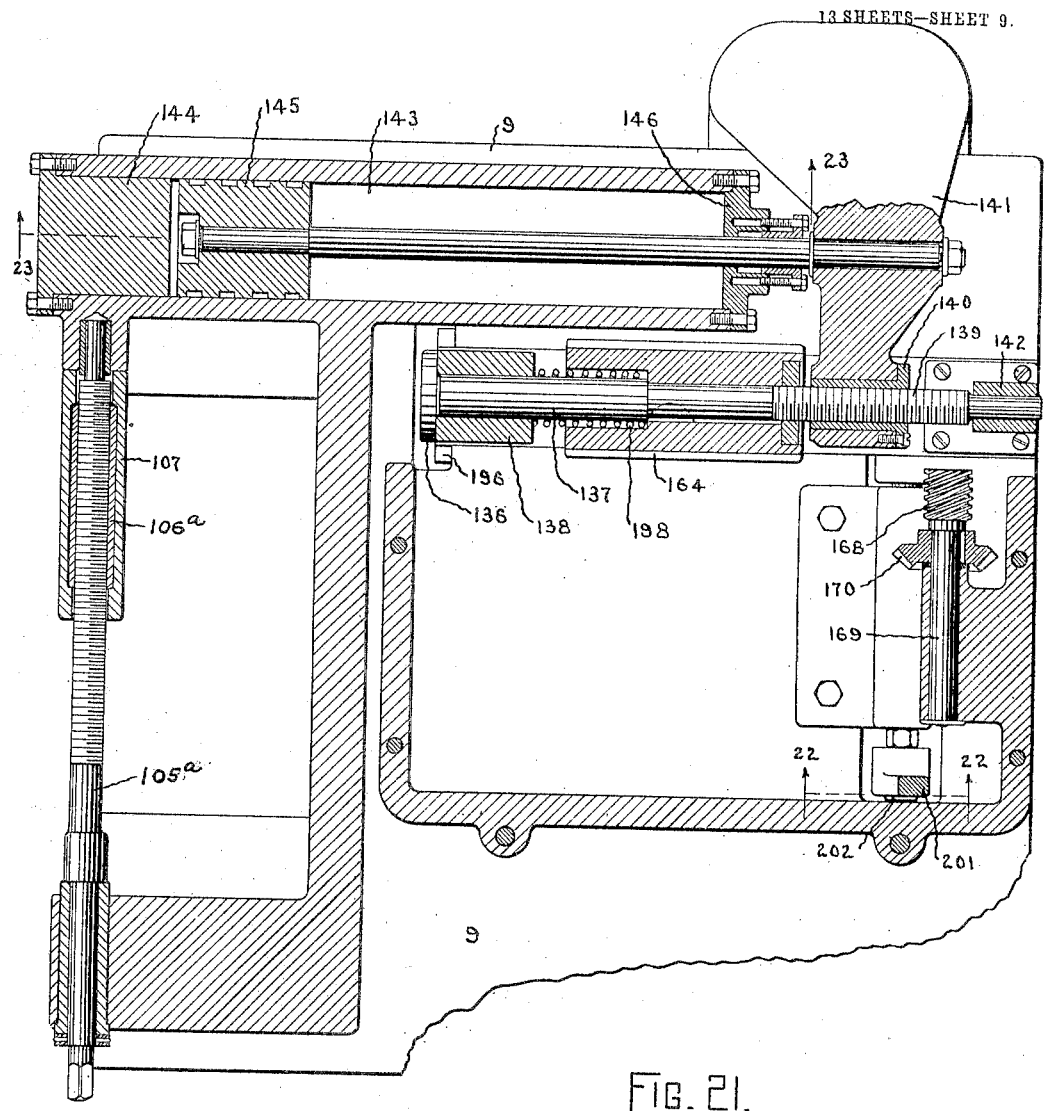
Figure 22:
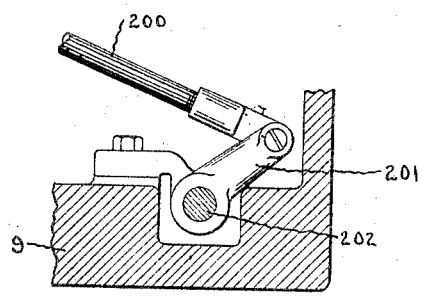
Figure 23:
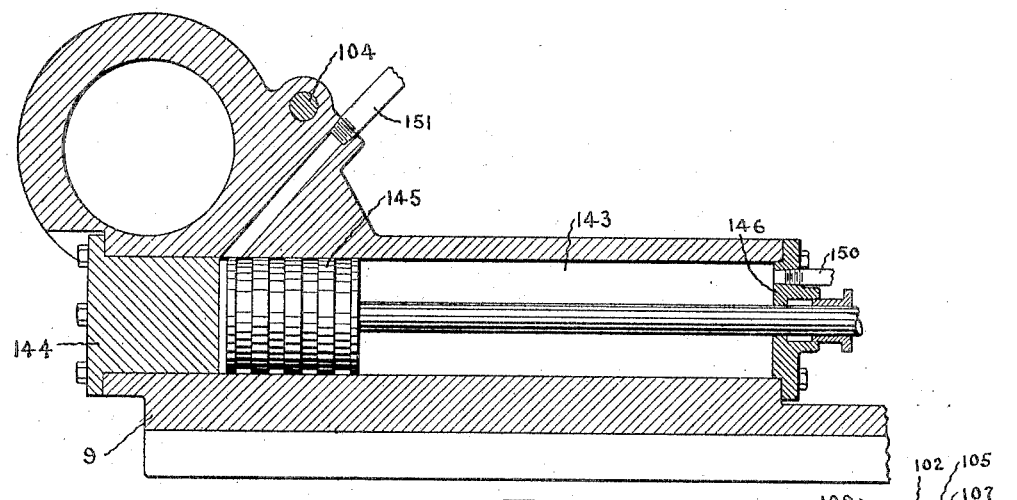
Figure 24:
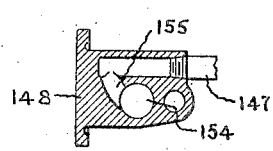
Figure 25:
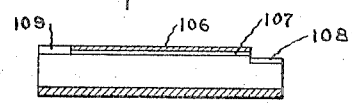
Figure 26:
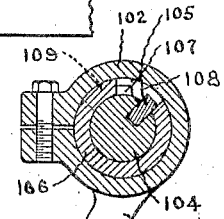
Figure 27:
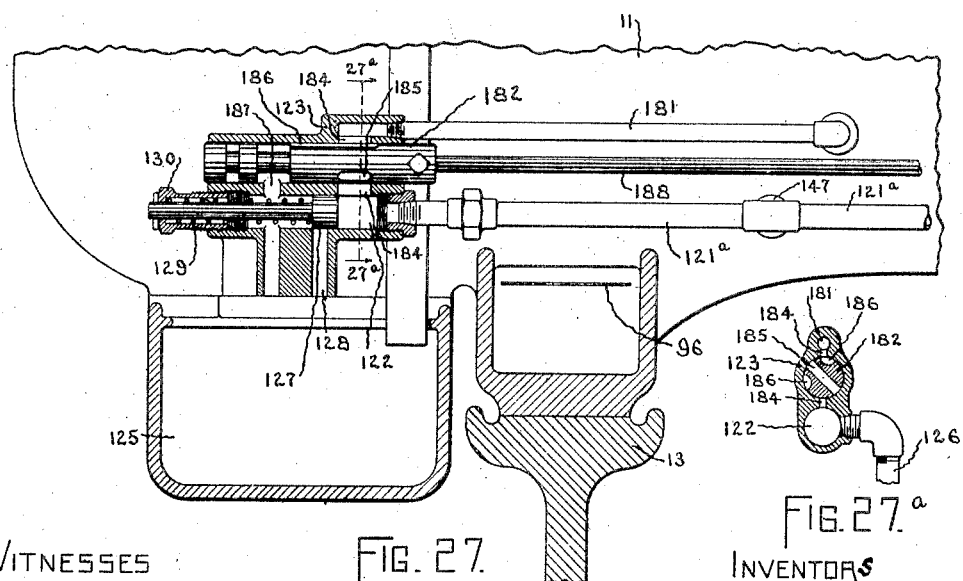
Figure 28:
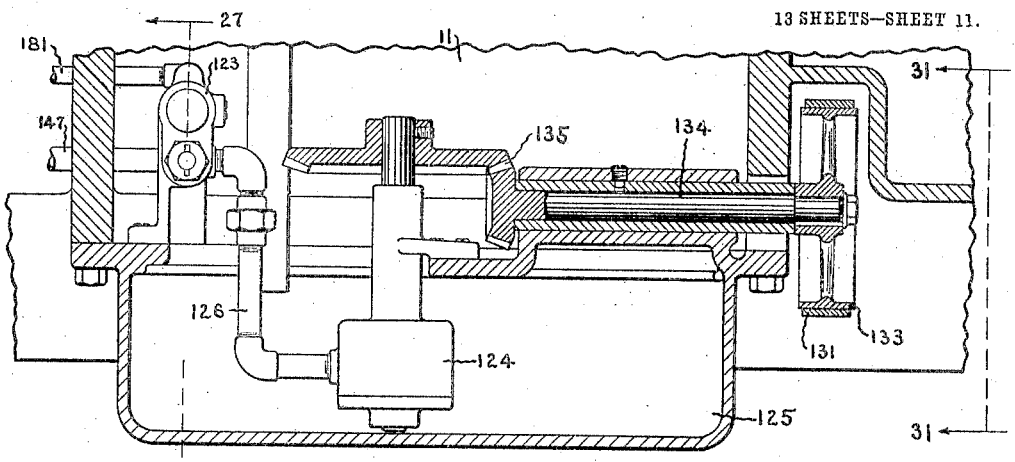
Figure 29:
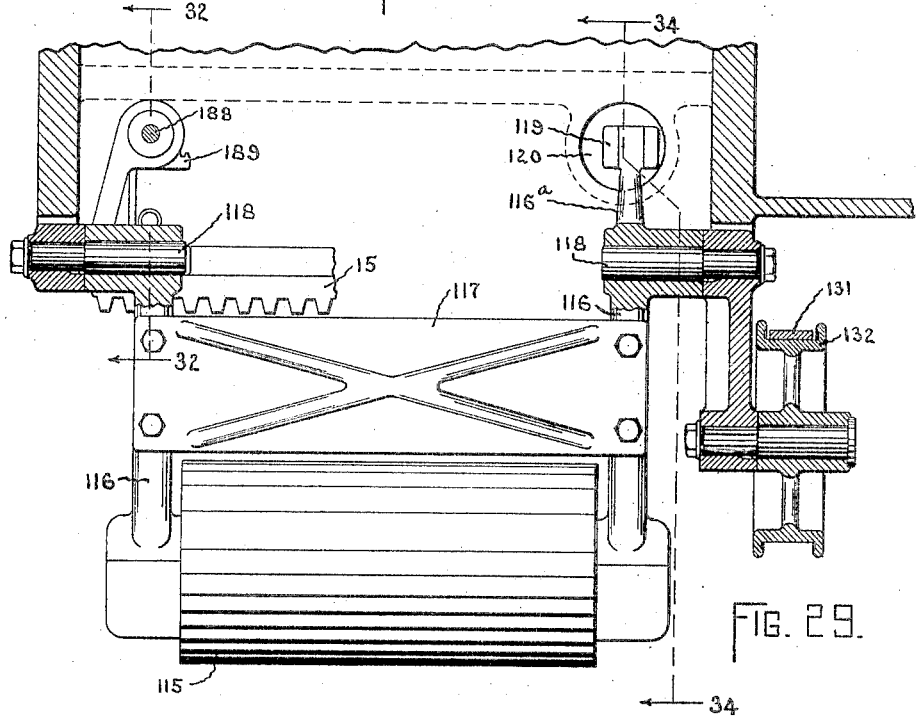
Figure 30:
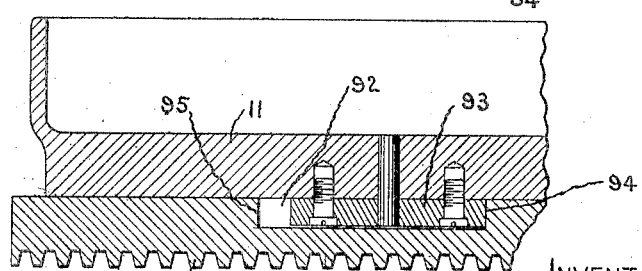

1. Fig. 17 is a partial elevation and partial section on the line 17 17, Fig. 16. Fig. 18 is a detail of the plate for indicating the adjustment of the cross-feed pawl. Fig. 19 is a sectional view on line 19 19, Fig. 16. Fig. 20 is a sectional view on line 20 20, Fig. 16. Fig. 21 is a sectional view on line 21 21, Fig. 16. Fig. 22 is a detail showing a section on line 22 22, Fig. 21. Fig. 23 is a sectional view on line 23 23, Fig. 21. Fig. 24 is a sectional view on line 24 24, Fig. 20. Figs. 25 and 26 are details of devices shown in Fig. 19 for controlling the shifting of the belt which drives the grinding-wheel spindle. Fig. 27 is a sectional view on line 27 27, Fig. 28. Fig. 27$^a$ is a sectional view on line 27$^a$ 27$^a$, Fig. 27. Fig. 28 is a vertical sectional view on line 28 28, Fig. 31, showing the oil tank and pump for maintaining a constant pressure in the pipes leading to the fluid-operated devices. Fig. 29 is a sectional elevation on line 29 29, Fig. 34, showing the take-up for the belt which drives the grinding-wheel spindle. Fig. 30 is a sectional detail on line 30 30, Fig. 32, showing the lost motion between the reciprocating carriage and its operating-rack. Fig. 31 is a detail elevation, partly in section, showing the belts for driving the fluid-pump and the grinding-wheel spindle, on line 31 31, Fig. 28. Fig. 32 is a sectional view on line 32 32, Fig. 29. Fig. 33 is a sectional detail on line 33 33, Fig. 32. Fig. 34 is a transverse sectional view on line 34 34, Fig. 29.

In the grinding-machine shown in the drawings the relative movement between the work and grinding wheel during the action of the wheel upon the work is effected by a longitudinal feed of the grinding-wheel, while the work is rotated on fixed centers. The work-centers on which the work is supported are mounted in head and tail stocks 1 2, adjustably secured upon ways formed on a swivel-table 3, such as is commonly used in grinding-machines of this general type. The work is continuously rotated by suitable gearing and shafting (indicated at 4, Fig. 1) which receives motion from a shaft 5, connected with the driving-shaft 6, Fig. 5, through a belt 7.

The grinding-wheel spindle 8 is carried by a cross-feed slide 9, mounted on ways 10, formed on a feed-carriage 11, Fig. 2. The grinding-wheel carriage 11 is mounted for movement upon front and rear ways 12 and 13, which extend longitudinally or lengthwise of the bed of the machine. The carriage is moved back and forth along the ways to feed the grinding-wheel along the work, and the cross-slide 9 may be advanced a step at each end of the stroke of the carriage to position the grinding-wheel for a fresh cut.

The grinding-wheel carriage 11 is given its feeding movements by means of two pinions 14, engaging a rack 15, connected with the carriage, Fig. 6. By employing two pinions the carriage may be given a wide range of movement with a comparatively short rack upon the carriage. The pinions 14 are formed upon shafts 14', which are connected, by means of gears 16, secured to the shafts, and intermediate gears 17, with a driving-pinion 18, through which the automatic movements are imparted to the pinions 14 and the carriage 11, Figs. 7 and 8. The pinion 18 is secured to a sleeve 19, loosely mounted upon a fixed shaft 20 and driven through a worm 21, which engages a worm-wheel 22, mounted upon the sleeve 19 and adapted to be connected or disconnected therewith. The means of connecting the worm-wheel 22 with the sleeve 19 consists of a clutch-sleeve 23, keyed to slide upon the sleeve 19 and provided with a clutch-face 24, adapted to engage a similar clutch-face formed on a disk secured to the worm-wheel. The clutch-sleeve 23 is forced yieldingly in engagement with the worm-wheel 22 by means of springs 25, which hold the clutch normally in engagement with the clutch-wheel. The clutch-sleeve may be disengaged from the worm-wheel to disconnect the grinding-wheel carriage from its operating mechanism by means of a lever 26, pivoted in lugs formed on a slide 27, which is mounted in a groove in the shaft 20 and is connected with a yoke 28, having an arm 29 engaging an annular groove in the clutch-sleeve. The end of the lever 26 is arranged to engage the end of the shaft 20, so that a downward movement of the lever will cause the slide 27 to be retracted, thereby disengaging the clutch-sleeve 23 from the worm-wheel 22. When the lever 26 is thrown upward again, the spring 25 will reëngage the clutch-sleeve with the worm-wheel, thereby throwing the carriage-feeding mechanism into operation again.

When the mechanism for automatically operating the carriage is thrown out of operation, the carriage may be manually operated by either of two hand-wheels 16$^a$, arranged at the front of the machine and secured to shafts 17$^a$, provided with pinions 18$^a$, engaging internal gear-teeth 19$^a$, formed on the gears 16, Fig. 6.

The worm 21 is rotated to feed the grinding-wheel carriage along the work in one direction for a predetermined distance and is then reversed and rotated in the opposite direction to feed the carriage a predetermined distance in the opposite direction by a driving and reversing mechanism which is controlled by dogs adjustably secured to a reversing-bar which moves in unison with the grinding-wheel carriage. The worm is driven through a clutch 30, keyed to slide upon a continuously-rotating shaft 31, Figs. 7, 11, and 12. The clutch 30 is provided with two oppositely-arranged clutch-faces arranged to engage similar clutch-faces formed on sleeves 32 33, surrounding the shaft 31 and separated therefrom by antifriction-sleeves 34. The sleeves 32 33 are mounted in bearings carried by a plate 35, secured to the front of the machine, and are provided with gears 36 37, keyed to the respective sleeves. The gear 37 directly engages a gear 39, secured to the worm-shaft, while the gear 36 is connected with the worm-shaft by means of an intermediate gear 38, engaging the gear 36 and a gear 40, secured to the worm-shaft. By shifting the clutch 30 from one clutch-sleeve to the other, therefore, the direction of rotation of the worm will be reversed, the grinding-wheel carriage being moved in one direction or the other, according to the clutch-sleeve with which the clutch 30 is engaged.

The clutch-shaft 31 is driven continuously through a gear 41, secured to the end of the shaft and engaging a gear 42, secured to a shaft 43, Figs. 5, 6, 7, and 11. The shaft 43, is connected, through gears 45, with a shaft 44, which is driven from the shaft 5 by a belt 46, passing over pulleys 47 and 48, secured to the respective shafts.

The clutch 30 is shifted to reverse the movement of the grinding-wheel carriage by the action of reversing-dogs 49 50, carried by a bar 51 and arranged to act upon a reversing-lever 52, the movement of which causes a shifting of the clutch. The bar 51, which carries the reversing-dogs, is so connected with the grinding-wheel carriage that any movement of the carriage is accompanied by a movement of the bar, the movement of the bar and carriage being in the same direction. The means for thus connecting the reversing-bar and reciprocating carriage consists of gearing interposed between the sleeve 19 and a rack 53, formed on the bar 51. This gearing is shown in Fig. 7 and consists of a gear 54, formed on the sleeve 19, which engages a gear 55, secured to a shaft 56, which is provided with a pinion 57, meshing with a pinion 58, which engages the rack 53.

The reversing-lever 52 is connected with the clutch through the intermediate devices shown in Figs. 3, 7, and 11 to 13. As shown in these views, the lever 52 is mounted upon a bearing 59, projecting from the front plate of the machine, and is provided on its lower end with a segment 60, engaging a segment formed on the end of an arm 61. The arm 61 is secured to the outer end of a rock-shaft 62, to the inner end of which is secured an arm 63. This arm 63 is provided at its lower end with projections 64, lying between collars 65 on a rod 66, so that the rod is moved by the rocking movement of the shaft 62 and arm 63. The rod 66 is mounted in bearing-sleeves 67, secured to a yoke 68, which is provided with arms 69, carrying rolls engaging an annular groove 70 in the clutch 30. The yoke 68 is supported by the bearing-sleeves 67, which engage bearing-bushings mounted in the plate 35. The rod 66, which is operated by the arm 63, is connected with the yoke 68 by means of springs 71 72, arranged between the collars 65 and the bottoms of the recesses formed in the sleeves 67.

When the shaft 62 is rocked by the engagement of one of the reversing-dogs with the upper end of the lever 52, the arm 63 acts to shift the rod 66 in one direction or the other, according to the direction in which the grinding-wheel carriage is moving. Suppose the parts to be in the position indicated in Figs. 11 to 13, then when the grinding-wheel carriage reaches the end of its stroke one of the dogs will strike the end of the reversing-lever 52, thereby swinging the arm 63 toward the right in these views. This movement will shift the bar 66 toward the right, and this bar acting through the spring 71 will tend to move the yoke 68 toward the right, and thus shift the clutch from the clutch-sleeve 32 to the clutch-sleeve 33. This movement of the yoke 68 will be prevented, however, by a latch 73, arranged to engage a shoulder 74 on the yoke. The shifting of the bar 66 will therefore compress the spring 71 until the latch 73 is disengaged from the shoulder 74 by the action of a cam 75, formed on the arm 63 and arranged to engage the end of the latch 73. When the latch is thus disengaged, the spring 71 will act to suddenly shift the yoke 68 and clutch toward the right, thereby engaging the clutch with the sleeve 33 and reversing the movement of the grinding-wheel carriage. When the grinding-wheel carriage reaches the end of its stroke in the opposite direction, the lever 52 will be shifted in the opposite direction, thereby moving the arm 63 toward the left. This movement of the arm will first compress the spring 72, the yoke being held by the latch 76, and the continued movement of the arm 63 will disengage the latch 76, thereby releasing the yoke, so that it will be suddenly shifted toward the left to engage the clutch 30 with the sleeve 32 and again reverse the movement of the grinding-wheel carriage. Thus the carriage will be reciprocated through a distance depending upon the adjustment of the dogs 49 and 50 upon the controlling-bar 51.

The reversing mechanism may be manually operated by means of either one of two levers 51$^a$, which are connected with the reversing-lever 52 by a rod 52$^a$, pivoted to the reversing-lever and to arms 53$^a$, projecting upward from the hubs of the levers 51$^a$, Figs. 1, 2, 3, and 7.

In order that the grinding-wheel carriage may be moved to a position beyond the reversing-point when desired without changing the adjustment of the reversing-dogs, the dogs are pivoted to the adjustable blocks 77 so that their front ends may be thrown up out of position to engage the lever 52. When thus thrown up, as indicated at the left in Fig. 3, the dog is held in raised position by a spring latch-pin 78, arranged to engage a recess in the dog, Fig. 4. When in this position, the dog will pass over the end of the lever 52 without operating the lever, and as it passes the lever it will be disengaged from the catch 78 and return to normal position by the action of the lever 52 upon a tailpiece 79 formed on the dog. When the carriage and the bar 51 move in the opposite direction, the dog will ride over the end of the lever 52 until it has passed the lever, when it will drop back into normal position, since the lifting of the dog by the lever is not sufficient to bring the recess in the dog into register with the spring-catch. The dog will now act upon the lever to reverse the movement of the grinding-wheel carriage until it is again moved out of operative position by the operator.

In order to enable the reciprocating carriage to be stopped at either end of its travel without requiring the presence and attention of the operator at the moment of such stopping, a device is provided which may be set by the operator at any time during the operation of the machine and which when so set will cause the arrest of the carriage at the point where it would otherwise be reversed. This device as embodied in the machine consists of a stopping device for arresting the movement of the reversing-clutch so that the clutch is retained in mid-position, and thus renders the carriage-operating mechanism inactive. The construction of this stop device is illustrated in Figs. 7, 11, 13 to 15. As shown in these views, the device consists of two stop-pawls 80 81, mounted upon a carrying-plate 82 and arranged to be brought into the path of coöperating shoulders or lugs 83 84 on the yoke 68. The pawls are pivoted on the shaft 85, to which the plate 82 is secured, and are held in normal position against the sides of a recess in the plate by springs 86. During the normal running of the machine the plate 82 stands in the position indicated in Fig. 14, in which the pawls 80 and 81 are held out of the path of the lugs 83 84, so that they do not interfere with the reversing movements of the yoke 68 and clutch 30. If it is desired that the carriage shall stop when it reaches the end of its stroke in the direction in which it is moving, the plate 82 is moved into the position indicated in Figs. 13 and 15. During this movement of the plate one of the stop-pawls will strike against the coöperating lug and will yield against the tension of its spring to allow the movement of the plate 82 into the position indicated. This movement of the plate will bring the other stop-pawl into the path of the corresponding lug on the yoke, where it will prevent sufficient movement of the reversing-clutch to reverse the movement of the carriage. As indicated in Figs. 13 and 15, the pawl 81 engages the lug 84 and yields to allow the movement of the plate 82, while the pawl 80 is brought into the path of the lug 83. Now when the arm 63 is shifted toward the right as the grinding-wheel carriage reaches the end of its stroke the lug 83 will bring up against the stop-pawl 80 after the clutch 30 has moved sufficiently to disengage it from the sleeve 32 and before it has moved far enough to engage with the sleeve 33. The clutch will therefore be held in mid-position and the carriage will remain at rest until the plate 82 is swung into normal position, thereby carrying the pawl 80 out of the path of the lug 83, so that the shifting movement of the clutch may be completed by the spring 72 and the movement of the carriage in the opposite direction take place.

The means for operating the carrier-plate 82 to set the stop-pawls or to return them to normal position consists of a lever $86^a$, pivoted on a bearing 87, which surrounds the shaft 62 and connected with the shaft 85, which carries the plate 82, by means of an arm 88, secured to said shaft and engaging a recess in the lower end of the lever. The upper end of the lever $86^a$ is provided with two arms 89, connected by a plate 90, which passes back of a guard-plate 91. The plate 90 is provided with the word "Stop," as indicated in Fig. 3, which appears at one side of the plate 91 when the lever is turned into position to set the stop-pawls to effect the stopping of the carriage. The plate may also be provided with the word "Reverse," which will appear on the opposite side of the plate 91 when the lever is in position with the stop-pawls out of operation, so that the reversing of the carriage will take place.

It is desirable, especially in grinding up to a shoulder on a piece of work, that the work should make at least a complete revolution at the end of the cutting stroke without any relative movement between the wheel and work, so that the work may be acted upon throughout its periphery by the grinding-wheel at this point. In order to accomplish this desirable result, means are provided for causing a dwell of the grinding-wheel carriage at each end of its reciprocation.

In the machine illustrated the dwell at the end of the reciprocation of the carriage is provided for by so connecting the rack 15 with the carriage 11 that the rack may have a limited movement with relation to the carriage when the movement of the carriage-operating mechanism is reversed. For this purpose the rack 15 is mounted in a guide-slot in the carriage 11 and is provided with a recess 92, within which is arranged a block 93, secured to the carriage, Fig. 30. The recess 92 is somewhat longer than the block 93, so that there is a limited amount of lost motion between the rack 15 and the carriage when the movement of the rack is reversed. For instance, if the parts are moving toward the left in Fig. 30 the right end 94 of the recess 92 will engage the end of the block 93, so that the carriage will move toward the left with the rack. When the motion of the operating mechanism for the carriage is reversed, the rack will move toward the right independently of the carriage 11 until the end 95 of the recess 92 strikes the block 93, when the carriage will be moved toward the right with the rack. During this independent movement of the rack 15, which will occur at each end of the stroke of the carriage, the carriage will remain stationary, so that the grinding-wheel may act through the circumference of the work without any progressive movement along the work.

The lost motion for effecting the dwell of the carriage may be provided for in any part of the connections between the reversing mechanism and the carriage; but it is preferred to provide the lost motion between the rack and carriage in the manner shown. The independent movement of the rack with relation to the carriage is also utilized to control the cross-feed of the grinding-wheel slide, as will be explained hereinafter.

In grinding-machines it is desirable that the ways on which the reciprocating carriage moves should be protected in order to avoid the accumulation of dirt and water thereon, and we have therefore provided the exposed rear way 13 for the carriage 11 with a guard which covers and protects that part of the way which is not engaged by the carriage. This guard consists of a flexible strip 96, which extends from one end of the way to the other and passes over guides 97 on the carriage, so that that part of the carriage which engages the way may travel back and forth under the guard-strip while the strip on each side of the carriage is maintained in close proximity to or engagement with the way, Fig. 10. Each end of the strip is secured to the base of the machine in the plane of the way, and the guides 97, under which the strip passes, are arranged to travel close to the way, so that the strip is lifted from the way on the advance side of the carriage and is directed down close to the way on the rear side of the carriage.

The spindle 8, which carries the grinding-wheel W, is continuously driven by a belt 98, passing over one of two pulleys 99 100 on the spindle and over a drum 101, secured to the driving-shaft 6, the belt traveling along the drum as the grinding-wheel carriage reciprocates, Figs. 1, 5, 16, 19, 31, and 34. The pulleys 99 and 100 are of different diameter, so that the speed of the spindle may be increased by shifting the belt from the pulley 99 to the pulley 100 after the grinding-wheel has worn down, and thus the peripheral speed of the wheel restored to the peripheral speed of the wheel when of original size. In order that the grinding-wheel may work efficiently, it is desirable that the belt should be shifted from the large pulley to the small pulley after the grinding-wheel has been worn away to a definite extent and that it should not be shifted previous to this time. It is also desirable that the wheel should be removed and a new wheel substituted when the wheel has been reduced in size to a certain point. It is also important that the belt should be returned to the large pulley when the new wheel is substituted for the old wheel.

In order to insure the shifting of the belt at the proper times and to prevent the shifting of the belt at other times, the machine is provided with means for positioning the belt, which is controlled or regulated by the size of the grinding-wheel. This means consists of a belt-shifter 102, provided with arms 103, arranged on opposite sides of the belt 98. The belt-shifter is supported upon a shaft 104 and upon a screw-shaft $105^a$, Figs. 16, 19, and 21. The shifter is moved to carry the belt from one pulley to the other by means of the screw-shaft $105^a$, which engages a nut $106^a$, carried in the lower sleeve 107 of the belt-shifter. The lateral movement of the belt-shifter to carry the belt from one pulley to the other is controlled by a key 105 on the shaft 104 and a controlling-sleeve 106, secured in the part of the shifter which surrounds the shaft 104.

The sleeve 106, as shown in Figs. 19, 25, and 26, is provided with a longitudinal slot 107 for the passage of the key 105 when the belt-shifter is moved laterally to shift the belt. The sleeve is cut away at each end to form recesses 108 109, which extend on opposite sides of the slot 107, the recess 108 extending from the left side of the slot toward the right in Fig. 26 and the recess 109 extending from the right side of the slot toward the left, as indicated in dotted lines in Fig. 26.

When a full-size grinding-wheel is on the grinding-wheel spindle, the belt is on the larger pulley 99 and the key 105 lies in the recess 108 to the right of the slot 107. While in this position the key will prevent the movement of the belt-shifter toward the right in Fig. 19, since the key is in the position to be engaged by the end of the recess in the sleeve 106. As the wheel is worn away the shaft 104 is rocked in a direction to move the key 105 toward the left in Fig. 26, and when the wheel has been worn away to a predetermined extent the key will be brought into position against the left side of the recess 108, where it will be in line with the slot 107. When the shaft 104 reaches this position, further movement of the shaft to correspond to further reduction in the diameter of the grinding-wheel is prevented. This indicates that the belt should be shifted to the smaller pulley. Since the key 105 and slot 107 are in line, the shifting of the belt is permitted at this time, and this shifting is effected by turning the screw-shaft 105. As the belt-shifter moves toward the right in Fig. 19 the slot 107 rides along the key 105 until the key is brought into register with the recess 109, at which time the belt is in position on the smaller pulley 100. The movement of the shaft 104 may now be continued as the wheel wears down until the key 105 brings up against the left side of the recess 109, Fig. 26, when further movement of the shaft is prevented, indicating that the wheel should be removed and a new wheel introduced. The means for controlling the movement of the shaft 104 is so arranged that the new wheel cannot be placed upon the spindle until the shaft 104 is returned to the position indicated in Fig. 26. In order to return the shaft to this position, it is necessary to turn the shaft back until the key 105 engages the right side of the recess 109 and to then shift the belt-shifter 102 to the left in Fig. 19, thus carrying the belt onto the larger pulley. The operator cannot, therefore, apply the new grinding-wheel until he has first shifted the belt onto the larger pulley and cannot, therefore, by mistake or carelessness cause the wheel to be driven from the smaller pulley and at a dangerous or inefficient speed.

The means for moving the shaft 104 in accordance with the reduction in diameter of the grinding-wheel consists of an arm 110, secured to the end of the shaft and provided with a slot 111, Fig. 16, for engaging a pin 112, projecting from the water-guard 113 for the grinding-wheel. It is essential to the proper operation and running of the machine that the front end 114 of the water-guard should be close up to the periphery of the grinding-wheel, and the operator must therefore adjust this guard as the grinding-wheel is worn away. The rearward movement of the guard to keep it in proper relation to the grinding-wheel results in a movement of the shaft 104. When the key 105 on the shaft 104 brings up against the side of the recess 108, thereby preventing further movement of the shaft, further rearward adjustment of the guard 114 is prevented. As the grinding-wheel wears down beyond this point, therefore, the operator must shift the belt onto the smaller pulley in order that he may continue the rearward adjustment of the guard which is necessary for its proper operation. When the movement of the shaft 104 is arrested by the engagement of the key 105 with the side of the slot 109, further rearward adjustment of the guard 113 is prevented, and the operator must therefore remove the wheel when it is worn down sufficiently to prevent the proper operation of the guard. In putting on a new grinding-wheel the guard must be returned to its original position, and this cannot be done until the belt has been shifted onto the larger pulley, as has been explained. This mechanism just described is an efficient form of speed-controller for the grinding-wheel which is dependent upon the diameter of the grinding-wheel for its operation in varying the speed of the grinding-wheel spindle.

The tension of the belt 98, which drives the grinding-wheel spindle, is maintained whatever the position of the cross-slide 9 by a belt-tightening or take-up pulley 115, which is forced constantly against the belt during the operation of the machine, Figs. 29 and 34. This pulley is mounted in two arms 116, connected by a plate 117 and pivoted upon studs 118. One of the arms 116 is provided with an upward extension $116^a$, which is connected, by means of a link 119, with a piston 120. The piston is mounted in a cylinder 121, to which oil is supplied under a constant pressure through a pipe $121^a$, which connects with the cylinder behind the piston. The pipe $121^a$ leads from the cylinder 121 to a pressure-chamber 122, formed in a valve-casing 123, Figs. 27, $27^a$, and 28. Oil is supplied to the pressure-chamber 122 by means of a pump 124, arranged in an oil-tank 125 and connected with the pressure-chamber through a pipe 126. A constant pressure is maintained in the pressure-chamber 122 and pipe $121^a$ during the operation of the machine by the action of the pump 124 in connection with a relief-valve 127, which controls the communication between the pressure-chamber and a passage 128, leading back into the supply-tank. The relief-valve is held in position by means of a spring 129, the tension of which may be adjusted by means of an adjusting-sleeve 130, so that the pressure in the pressure-chamber may be regulated as desired. The pump supplies an excess of oil to the chamber, and as soon as the pressure in the chamber is sufficient to overcome the tension of the spring 129 the valve 127 will open to allow the excess of oil to flow back into the oil-tank through the passage 128, thus maintaining a constant pressure in the pressure-chamber.

The action of the fluid under pressure upon the piston 120 forces the take-up pulley 115 against the belt with a uniform pressure whatever the position of the cross-slide 9, thereby maintaining a constant and uniform tension upon the belt.

The pump 124 is driven from the drum 101 through a belt 131, passing from the drum over guide-pulleys 132 and to a pulley 133, secured to a shaft 134, which is connected, by means of gears 135, with the pump, Figs. 5, 28, and 31. The pump will therefore be driven continuously during the operation of the machine to maintain the pressure in the chamber 122 and pipe $121^a$, but will cease to act as soon as the machine is stopped, thereby relieving the pressure. The take-up pulley 115 will therefore rest idly upon the belt 98 when the machine is not running, and the tension on the belt will be relieved.

The position of the cross-slide 9 upon the carriage 11, and therefore the distance of the periphery of the grinding-wheel from the axis of the work, is determined and controlled by a stop connected with the carriage and a cooperating stop connected with the slide, the stops being pressed together during the action of the grinding-wheel upon the work. In case of a special machine adapted for grinding one size of work these two stops may be immovably secured upon the carriage and slide. The machine shown, however, is a machine adapted for grinding various sizes of work, and one of the stops is so connected with the part which carries it that the position of the stop upon said part may be varied to vary the position of the grinding-wheel with relation to the work in grinding different sizes of work and in effecting the cross-feed of the wheel for successive cuts upon the same piece of work.

Various devices or mechanisms may be employed for pressing the stops together, and thereby accurately positioning the grinding-wheel slide, although we prefer to press the stops together by means of a fluid under constant pressure, since with such construction the pressure may be accurately regulated, so that the stops will be forced together uniformly in taking successive cuts and in acting upon successive pieces of work. The use of a fluid under pressure for this purpose also contributes to the simplicity of the construction and of the devices for moving and controlling the heavy grinding-wheel slide.

The stops for controlling the position of the cross-slide in the machine shown consist of a stop-flange 136, formed on a screw-shaft 137, and a stop-block 138, connected with the cross-slide 9. The screw-shaft 137, on which the stop 136 is formed, is provided with a screw-threaded portion 139, engaging a nut 140, secured in an arm 141, which is bolted to the carriage 11 and extends up into a position above the cross-slide, Figs. 19 and 21. The shaft 137 extends through the stop-block 138, and its rear end is journaled in a bearing 142, connected with the cross-slide. The stops 136 and 138 are pressed together by the action of oil under pressure supplied to a cylinder 143 between the end 144 of the cylinder and a piston 145, the cylinder being connected with the cross-slide and the piston being connected with the arm 141 of the carriage. When oil is supplied to this part of the cylinder, the pressure of the oil upon the end 144 of the cylinder forces the cross-slide forward, thereby pressing the block 138 firmly against the stop-flange 136 with a constant and uniform pressure.

It is frequently desirable to move the grinding-wheel away from the work and to then return the wheel to its former position. The cross-slide may be moved to carry the stop-block 138 away from the stop 136 by admitting oil under pressure into the cylinder 143 between the end 146 of the cylinder and the piston 145, the oil in the other end of the cylinder being allowed to escape at such time. This movement of the cross-slide will carry the grinding-wheel away from the work without disturbing the adjustment of the stops upon the carriage and cross-slide. The wheel may be accurately returned to its former position, therefore, by again introducing the oil into the cylinder 143 between the end 144 of the cylinder and the piston 145, so that the stops will be again forced together with the same pressure as before they were separated.

Oil under pressure is supplied to the cylinder 143 through a pipe 147, leading from the pipe 121$^a$ to a valve-casing 148, Figs. 20, 24, 27, and 28. The opposite ends of the cylinder 143 are connected with the valve-casing 148 through pipes 150 and 151, and the supply of oil to the cylinder is controlled by a valve 152, mounted in the valve-casing and provided with an operating-rod 153, extending to the front of the cross-slide, where it is within convenient reach of the operator. The valve-chamber 154, within which the valve 152 fits, is connected with the supply-pipe 147 through a port 155 and is connected with the pipes 150 and 151 through ports 156 and 157. The valve-chamber also communicates with an exhaust-pipe 158 through exhaust-ports 159 and 160. The valve is provided with three pistons 161, 162, and 163 for controlling the communication between the various ports, and thus controlling the supply and exhaust of the oil to and from the opposite ends of the cylinder 143.

During the normal running of the machine the stops on the cross-slide and carriage are forced toward each other and the valve 152 occupies the position shown in Fig. 20. When the valve is in this position, the port 155 is in communication with the port 157, so that oil is supplied to the cylinder 143 through pipe 151 and a constant pressure is maintained in the cylinder between the end 144 and the piston 145. When it is desired to move the cross-slide back temporarily, the operator pushes in the rod 153. This movement of the valve-rod brings the piston 162 between the ports 157 and 155, cutting off the communication between the oil-supply and the pipe 151 and opening up the communication between said pipe and the exhaust-port 160. This movement of the valve also carries the piston 161 into position between the port 156 and the port 159, thereby shutting off the communication between the pipe 150 and the exhaust and opening up the communication between this pipe and the supply-pipe 147. Oil is now forced into the cylinder 143 between the end 146 and the piston 145, thereby moving the cross-slide back until its backward movement is arrested by the engagement of the block 138 with the end of a gear 164, the function of which will be explained later. When the slide is to be returned to its previous position, the operator draws the rod 153 upward, thereby returning the valve to the position shown in Fig. 20 and connecting the pipe 151 with the oil-supply and the pipe 150 with the exhaust. This construction provides a simple and efficient means for moving the grinding-wheel away from the work and then returning it to its normal position and a means which may be conveniently and readily controlled by the operator without material exertion upon his part. The position of the stop 136 is varied to determine the cross-feed of the slide in taking excessive cuts or to determine the position of the cross-slide in grinding a given piece of work by turning the shaft 137 in the nut 140. The rotation of the shaft is effected through the gear 164, which is keyed to the shaft and is engaged by a gear 165, secured to a shaft 166. This shaft 166 carries a worm-wheel 167, which is engaged by a worm 168, secured to a shaft 169, connected, by means of bevel-gears 170, with a feed-shaft 171. The feed-shaft 171 extends to the front end of the cross-slide and is provided at its outer end with a hand-wheel 172, by which the shaft may be turned to manually adjust or vary the position of the stop 136. Means are also provided for automatically operating the feed-shaft 171 at each end of the reciprocation of the grinding-wheel carriage to effect the cross-feed of the grinding-wheel for successive cuts. The shaft 171 is operated automatically through a ratchet-wheel 173, secured to the front end of the shaft and arranged to be engaged by a pawl 174, carried by a pawl-carrying disk 175. The pawl-carrying disk is oscillated through a fixed distance as the carriage reverses at either end of its stroke by means of a rack 176, engaging a gear-segment 177 on the disk 175. The rack is formed on a plunger 178, mounted in a cylinder 179 and forced normally to the rear end of the cylinder by a spring 180, Fig. 17. The plunger 178 is operated to give the pawl-carrying disk its feeding movements by means of oil under pressure admitted to the cylinder 179 back of the plunger 178. Immediately after the advance movement of the plunger the pressure of the oil is relieved, so that the plunger and pawl-carrying disk are immediately returned to normal position by the spring 180, the pawl riding onto the shield, where it does not interfere with the manual operation of the cross-feed.

The means for supplying oil at the proper intervals to the cylinder 179 consists of a pipe 181, leading from the cylinder to the valve-casing 123, and a valve 182 for controlling the communication between the pipe 181 and the pressure-chamber 122, Figs. 2, 17, and 27. The valve-casing 123 is provided with a passage 184, leading from the pressure-chamber 122 to the pipe 181, and the valve 182 is arranged in this passage and is provided with a port 185 for establishing communication between the pressure-chamber 122 and the pipe 181. The valve is also provided with two ports 186, arranged on opposite sides of the port 185 and adapted to connect the pipe 181 with an exhaust-passage 187, leading to the oil-tank 125. The valve 182 is secured to a rock-shaft 188, by which the valve is operated to open the pipe 181 to the oil-supply and then cut off the supply and open the pipe to the exhaust-passage 187. The independent movement of the rack 15 with relation to the grinding-wheel carriage, which takes place at each end of the stroke of the carriage, is utilized to give the shaft 188 its operative movements. For this purpose a short rack 189 is secured to the rack 15 and engages a pinion 190, secured to the shaft 188, Figs. 29, 32, 33, and 34.

During the travel of the carriage from one end of its stroke to the other the valve 182 is in position, with one of the ports 186 registering with the passage 184, so that the pipe 181 is in communication with the exhaust-passage 187—as, for instance, in the position shown in Figs. 27 and 27$^a$. When the movement of the rack 15 is reversed at the end of the stroke of the carriage, the movement of the rack with relation to the carriage will slowly turn the valve 182. This movement of the valve will carry the port 186 out of register with the passage 184 and will bring the port 185 into register with said passage, so that oil will be supplied to the pipe 181, thereby operating the plunger 178 and the feed-pawl. The continued movement of the valve 182 will carry the port 185 out of register with the passage 184 and will bring the port 186 on the opposite side of port 185 into register with the upper part of the passage 184, thereby opening the pipe 181 to the exhaust-passage 187, so that the spring 180 may act to return the plunger 178 and the feed-pawl to normal position. When the movement of the rack is again reversed at the opposite end of the stroke of the carriage, the valve 182 will be turned back into the position shown in Figs. 27 and 27$^a$, thus opening the pipe 181 to the oil-supply and then shutting off the supply and opening the pipe to the exhaust. Thus during the dwell of the carriage at each end of its reciprocation the feed-pawl is operated to effect the cross-feed of the grinding-wheel.

The feed-pawl 174 is moved through a fixed distance at each operation, and the feeding action of the pawl is regulated and determined by a guard 191, which is arranged to underlie the pawl and hold it out of engagement with the ratchet-wheel 173 during a greater or less part of its feeding movement, according to the adjustment of the guard. The guard is secured upon a sleeve 192, which surrounds the shaft 171 and forms the front bearing for said shaft, the sleeve being mounted in a bearing at the front of the cross-slide. The sleeve 192 may be adjusted to vary the position of the guard 191 by means of a worm 193 engaging worm-teeth on the sleeve and provided with a knurl thumb-piece 194, by which it may be turned. The guard may be provided with graduations indicating the number of thousandths of an inch the grinding will be advanced with a given adjustment of the guard. The ratchet-wheel is also provided with a stop-guard 195, adjustably secured to the ratchet-wheel for determining the extent to which the ratchet-wheel may be turned by the pawl before the feed is arrested. The pawl will continue to operate upon the ratchet-wheel until the stop-guard is advanced into position to prevent the engagement of the pawl with the ratchet during its entire advance movement, when the feeding action of the pawl will cease.

By employing the regulating-guard and the stop-guard the action of the pawl may be accurately regulated to produce the required advance movement of the grinding-wheel for each cut and to accurately determine the final position of the grinding-wheel in making the finishing cut, thus enabling duplicate pieces to be accurately and uniformly ground.

In order to enable the cross-slide to be quickly and conveniently moved in making large and approximate adjustments of the cross-slide and also to provide for a wide range in the movement of the cross-slide, we have provided means for adjusting the cross-slide independently of the cross-feed mechanism. For this purpose in the machine shown the stop-block 138, which coöperates with the feed-stop 136 in positioning the cross-slide, is connected with the cross-slide by means of a slide 196, mounted in the cross-slide and clamped thereto by means of a clamping-gib 197, Figs. 19 and 21. When the slide 196 is clamped to the cross-slide, the stop-block 138 becomes a rigid part of the cross-slide; but when the clamping-gib 197 is released the stop-block 138 is disconnected from the cross-slide, so that the cross-slide may move independently of the block 138 and independently of the feed-stop 136 and of the cross-feed mechanism. When the block 138 is thus disconnected from the cross-slide, the slide will be moved in either direction, depending upon the supply of oil to the cylinder 143, and the slide will continue to move until its movement is arrested by the engagement of the piston 145 with one end of the cylinder or is arrested by a reclamping of the slide 196 to the cross-slide. In order to maintain the stops 138 and 136 in engagement during the independent movement of the cross-slide, a spring 198 is interposed between the block 138 and the gear 164. In order to accommodate the movements of the cross-slide with relation to the shaft 137 when the stop-block 138 is disconnected from the cross-slide, the gear 164 is provided with an elongated face, and a second gear 165ª, similar to gear 165, is secured upon the shaft 166. With this arrangement the gear 164 will be in engagement with one or the other of gears 165 165ª whatever the position of the feed-stop 136 and stop-block 138 with relation to the cross-slide.

The clamping-gib 197 is operated to clamp or unclamp the slide 196 by means of an operating-rod 200, one end of which projects from the front of the cross-slide where it may be conveniently operated by the operator and the other end of which is connected to an arm 201, secured to a rock-shaft 202, Figs. 19, 20, 21, and 22. The shaft 202 is provided with a screw-threaded end 203, Fig. 19, engaging internal screw-threads formed in the bar 204, which carries the clamping-gib. The opposite end of the shaft 202 bears against a fixed part 205 of the cross-slide, so that by turning the shaft 202 the gib may be forced against the slide 197. When the slide is to be unclamped, the operator draws forward the rod 200, rocking the arm 201 and shaft 202 toward the left in Fig. 22. The cross-slide will now be moved in one direction or the other, and when it has been moved to approximately the desired position the operator draws outward the rod 200, thereby clamping the slide 196 to the cross-slide, so that the stops 136 and 138 will prevent further movement of the cross-slide.

What we claim, and desire to secure by Letters Patent, is—

1. In a grinding-machine the combination of a work-support, a grinding-wheel spindle, a carriage carrying one of said parts, mechanism for reciprocating said carriage, and means which may be set at the will of the operator during the reciprocation of the carriage for stopping the carriage at the end of its stroke.

2. In a grinding-machine the combination of a work-support, a grinding-wheel spindle, a carriage carrying one of said parts, mechanism for reciprocating said carriage, and means which may be set at the will of the operator during the reciprocation of the carriage for stopping the carriage when it reaches the end of the stroke during which the stopping means is set.

3. In a grinding-machine the combination of a work-support, a grinding-wheel spindle, a carriage carrying one of said parts, mechanism for moving the carriage in either direction and automatically reversing the movement of the carriage, and means which may be set at the will of the operator during the reciprocation of the carriage for preventing the reversal of the carriage at the end of its stroke in either direction.

4. In a grinding-machine the combination of a work-support, a grinding-wheel spindle, a carriage carrying one of said parts, mechanism for reciprocating the carriage including a reversing-clutch, and a device which may be set by the operator for stopping the clutch in mid-position.

5. In a grinding-machine the combination of a work-support, a grinding-wheel spindle, a carriage carrying one of said parts, mechanism for reciprocating said carriage including a reversing-clutch, stop-shoulders connected with the clutch, and stop-pawls which may be set by the operator to engage said shoulders and hold said clutch in mid-position.

6. In a grinding-machine the combination of a work-support, a grinding-wheel spindle, a carriage carrying one of said parts, mechanism for reciprocating said carriage including a reversing-clutch, stop-pawls for stopping the clutch in mid-position, and means for rendering said pawls active or inactive at the will of the operator.

7. In a grinding-machine the combination of a work-support, a grinding-wheel spindle, a carriage carrying one of said parts, mechanism for reciprocating said carriage including a reversing-clutch, stop-shoulders connected with the clutch, two stop-pawls for coöperating with said shoulders, a plate on which said stop-pawls are mounted, and an operating device under the control of the operator for moving said plate to carry the pawls into or out of the path of said shoulders.

8. In a grinding-machine the combination of a work-support, a grinding-wheel spindle, a carriage carrying one of said parts, mechanism for reciprocating said carriage including a reversing-clutch, stop-shoulders connected with the clutch, stop-pawls for coöperating with said shoulders, a plate upon which said stop-pawls are mounted, springs for holding said pawls in normal position upon the plate, and means under the control of the operator for moving said pawls into and out of the path of said stop-shoulders.

9. In a grinding-machine the combination of a reversing-bar, a pivoted dog thereon, a reversing mechanism having a part in the path of the dog, a catch for holding the dog in position to pass said part, and means for disengaging the dog and catch as the dog passes said part.

10. In a grinding-machine the combination of a reversing-bar, a pivoted dog thereon, a reversing mechanism having a part in the path of the dog, a spring-catch for holding the dog in position to pass said part, and a tailpiece on the dog for riding against said part and disengaging the dog and catch.

11. In a grinding-machine the combination of a work-support, a grinding-wheel spindle, a reciprocating carriage carrying one of said parts, a way for said carriage, a flexible protecting-strip extending from end to end of the way, and guides on the carriage over which the strip passes as the carriage reciprocates along the strip and way.

12. In a grinding-machine the combination of the reciprocating feed-carriage, a way therefor, a stationary protecting-strip extending from end to end of the way, and guides on the carriage over which the strip passes.

13. In a grinding-machine the combination of a work-support, a grinding-wheel spindle, a reciprocating carriage carrying one of said parts, mechanism for rotating the work, mechanism for reciprocating the carriage, and means for causing a dwell of the carriage at the end of its stroke during a complete revolution of the work.

14. In a grinding-machine the combination of a work-support, a grinding-wheel spindle, a carriage carrying one of said parts, mechanism for feeding and reversing said carriage having a limited movement independent of the carriage in reversing the same.

15. In a grinding-machine the combination of a work-support, a grinding-wheel spindle, a carriage carrying one of said parts, reversing mechanism, and driving connections between the reversing mechanism and carriage having lost motion therein for producing a dwell of the carriage at the end of its stroke.

16. In a grinding-machine the combination of a work-support, a grinding-wheel spindle, a carriage carrying one of said parts, a feed-rack having a limited movement independent of the carriage, and mechanism for reciprocating the rack.

17. In a grinding-machine the combination of a grinding-wheel spindle, mechanism for driving said spindle at different speeds, and means for changing the speed controlled by the size of the grinding-wheel.

18. In a grinding-machine the combination of a grinding-wheel spindle, mechanism for driving said spindle at high or low speed, and means for preventing the change from the high to the low speed while the grinding-wheel is of more than a predetermined diameter.

19. In a grinding-machine the combination of a grinding-wheel spindle, mechanism for driving said spindle at a high or low speed, and means for preventing the application of a wheel of greater than predetermined size to the spindle while the driving mechanism is adjusted for the low speed.

20. In a grinding-machine the combination of a grinding-wheel spindle, mechanism for driving said spindle at different speeds, and means coöperating with the grinding-wheel the operation of which requires a change in the speed when the diameter of the wheel is varied beyond predetermined limits.

21. In a grinding-machine the combination of a grinding-wheel spindle, mechanism for driving the spindle at different speeds, an adjustable water-guard coöperating with the grinding-wheel, and means for controlling the variation of the speed connected with the water-guard.

22. In a grinding-machine the combination of a grinding-wheel spindle, mechanism for driving the spindle at different speeds, a speed-changing device, a device for controlling the operation of the speed-changing device, an adjustable water-guard for the grinding-wheel, and connections between the controlling device and guard for operating the device by the movement of the guard.

23. In a grinding-machine the combination of a grinding-wheel spindle, pulleys of different size connected thereto, a driving-belt, a shifter therefor, and means for controlling the movement of the shifter the operation of which is dependent upon the diameter of the grinding-wheel.

24. In a grinding-machine the combination of a grinding-wheel spindle, pulleys of different size connected therewith, a driving-belt, a shifter therefor, a water-guard for the grinding-wheel, and means for controlling the movement of the shifter through the adjustment of the water-guard.

25. In a grinding-machine the combination of a grinding-wheel spindle, pulleys of different size connected therewith, a driving-belt, a shifter therefor, a controlling-sleeve carried by said shifter provided with a longitudinal slot and recesses at opposite ends and arranged on opposite sides of said slot, and a rock-shaft provided with a key for engaging said slot and recesses.

26. In a grinding-machine the combination of a grinding-wheel spindle, pulleys of different size connected therewith, a driving-belt, a shifter therefor, a sleeve connected with said shifter and provided with a longitudinal slot and recesses arranged at opposite ends and on opposite sides of said slot, a rock-shaft provided with a key for engaging said recesses and slot, a water-guard for the grinding-wheel, and connections between said shaft and water-guard.

27. In a grinding-machine the combination of a cross-feed slide, a grinding-wheel spindle mounted therein, a pawl and ratchet for controlling the feed of the slide, mechanism for giving the pawl a constant throw, and an adjustable guard between the ratchet and pawl for determining the feeding action of the pawl.

28. In a grinding-machine the combination of a cross-feed slide, a grinding-wheel spindle mounted therein, a pawl and ratchet for controlling the feed of the slide, mechanism for giving the pawl a constant throw, an adjustable guard between the ratchet and pawl for determining the feeding action of the pawl, and a stop-guard adjustably connected with the ratchet for arresting the feeding action of the pawl.

29. In a grinding-machine the combination of a cross-feed slide, a grinding-wheel spindle mounted thereon, a pawl and ratchet for controlling the feed-slide, a guard normally between the ratchet and pawl for determining the feeding action of the pawl, and means for manually turning the ratchet.

30. In a grinding-machine the combination of a cross-feed slide, a grinding-wheel spindle mounted thereon, a ratchet through which the feed-slide is controlled, a reciprocating pawl for operating the ratchet, a guard on which the pawl rides in its retracted position, and means for manually turning the ratchet.

31. In a grinding-machine the combination of a cross-feed slide, a grinding-wheel spindle mounted thereon, feed mechanism for the feed-slide, a plunger for operating said mechanism, a cylinder for said plunger, and means for intermittently connecting said cylinder with a fluid-supply a fluid-exhaust and a spring for retracting the plunger.

32. In a grinding-machine the combination of a cross-feed slide, a grinding-wheel spindle mounted thereon, a feed mechanism for the feed-slide, a plunger for operating said mechanism, a cylinder for said plunger, a valve for controlling the communication between said cylinder and a fluid-supply and fluid-exhaust, and means for intermittently operating said valve to connect the cylinder with the fluid-supply and immediately thereafter with the fluid-exhaust.

33. In a grinding-machine the combination of a work-support, a grinding-wheel spindle, a reciprocating carriage carrying one of said parts, a reversing mechanism for said carriage, a cross-feed slide on which the grinding-wheel spindle is mounted, feed mechanism for the feed-slide, a plunger for operating said mechanism, a cylinder for said plunger, and means operated by the reversing mechanism for connecting said cylinder with a fluid-supply a fluid-exhaust at each operation of the reversing mechanism.

34. In a grinding-machine the combination of a work-support, a grinding-wheel spindle, a carriage carrying one of said parts, a reversing mechanism for said carriage, a cross-feed slide upon which the grinding-wheel spindle is mounted, a feed mechanism for the feed-slide, a plunger for operating said mechanism, a cylinder for said plunger, a valve for controlling the communication between said cylinder and a fluid-supply and fluid-exhaust, and means for operating said valve through the carriage-reversing mechanism.

35. In a grinding-machine the combination of a cross-feed slide, a grinding-wheel spindle mounted thereon, feed mechanism for the feed-slide including a ratchet-wheel, a pawl for operating said ratchet-wheel, a plunger connected with said pawl for reciprocating the same, a cylinder in which said plunger moves, a spring for retracting said plunger, and means for intermittently supplying fluid under pressure to said cylinder.

36. In a grinding-machine the combination of a work-support, a grinding-wheel spindle, a carriage carrying one of said parts, a feed-rack connected with said carriage and having a limited movement independent thereof, mechanism for reciprocating said rack, a cross-feed slide on which the grinding-wheel spindle is mounted, fluid-operated feed mechanism for the feed-slide, and means operated by the independent movement of the feed-rack for controlling the supply and exhaust of fluid to said feed mechanism.

37. In a grinding-machine the combination of a grinding-wheel spindle, a cross-feed slide on which said spindle is mounted, a carriage carrying said feed-slide, fluid-operated feed mechanism for the feed-slide, a valve for controlling the supply and exhaust of fluid thereto, reversing mechanism for the carriage, and means for operating said valve through said reversing mechanism.

38. In a grinding-machine the combination of a cross-feed slide, a grinding-wheel spindle mounted thereon, a stop for determining the position of the cross-slide, and means for pressing the slide against the stop during the action of the wheel upon the work.

39. In a grinding-machine the combination of a cross-feed slide, a grinding-wheel spindle mounted thereon, a stop for determining the position of the cross-slide, and means for holding the slide against the stop by fluid under pressure.

40. In a grinding-machine the combination of a cross-feed slide, a grinding-wheel spindle mounted thereon, a stop for determining the position of the cross-slide, means for moving the slide away from the stop and returning it again at the will of the operator.

41. In a grinding-machine the combination of a cross-feed slide, a grinding-wheel spindle mounted thereon, a stop for determining the position of the cross-slide, and means under the control of the operator for moving the slide away from the stop and returning it again by fluid under pressure.

42. In a grinding-machine the combination of a cross-feed slide, a grinding-wheel spindle mounted thereon, a stop for determining the position of the cross-slide, a cylinder and piston one of which is connected with the slide, means for supplying fluid under pressure to either end of the cylinder, and a valve under the control of the operator for controlling the supply of fluid to the cylinder.

43. In a grinding-machine the combination of a cross-feed slide, a grinding-wheel spindle mounted thereon, two engaging stops for determining the position of the cross-slide one of which is on the slide, mechanism for intermittently varying the position of one of said stops, and means for continually pressing said stops together.

44. In a grinding-machine the combination of a cross-feed slide, a grinding-wheel spindle mounted thereon, two engaging stops for determining the position of the cross-slide one of which is on the slide, feed mechanism for operating one of said stops and means for continually pressing said stops together by fluid under pressure.

45. In a grinding-machine the combination of a cross-feed slide, a grinding-wheel spindle mounted thereon, a feed-stop for determining the position of the cross-slide, feed mechanism for operating the same, and means for pressing the slide against said stop by fluid under pressure.

46. In a grinding-machine the combination of a cross-feed slide, a grinding-wheel spindle mounted thereon, a feed-stop for determining the position of the cross-slide, feed mechanism for operating said stop, a cylinder and piston one of which is carried by said slide, and means for supplying a fluid under pressure to said cylinder.

47. In a grinding-machine the combination of a cross-feed slide, a grinding-wheel spindle mounted thereon, a feed-stop for determining the position of the cross-slide, feed mechanism for operating said stop, a cylinder and piston one of which is connected with the cross-slide, and a valve under the control of the operator for controlling the supply of fluid under pressure to said cylinder.

48. In a grinding-machine the combination of a cross-feed slide, a grinding-wheel spindle mounted thereon, two engaging stops for determining the position of the cross-slide one of which is on the slide, feed mechanism for operating one of said stops, a cylinder and piston one of which is connected with the cross-slide, and means for supplying a fluid under pressure to said cylinder.

49. In a grinding-machine the combination of a cross-feed slide, a grinding-wheel spindle mounted thereon, cross-feed mechanism for the slide, and mechanism for operating the slide independently of the cross-feed mechanism.

50. In a grinding-machine the combination of a cross-feed slide, a grinding-wheel spindle mounted thereon, cross-feed mechanism for the slide, means for disconnecting the slide from said mechanism, and mechanism for operating the slide when disconnected.

51. In a grinding-machine the combination of a cross-feed slide, a grinding-wheel spindle mounted thereon, two stops for determining the position of the cross-slide one of which is on the slide, means for disconnecting said stop from the slide, and mechanism for operating the slide when disconnected.

52. In a grinding-machine the combination of a cross-feed slide, a grinding-wheel spindle mounted thereon, two engaging stops for determining the position of the cross-slide, feed mechanism for operating one of said stops, means for connecting and disconnecting one of said stops with the cross-slide, and mechanism for operating the slide when the stop is disconnected therefrom.

53. In a grinding-machine the combination of a cross-feed slide, a grinding-wheel spindle mounted thereon, two engaging stops for determining the position of the cross-slide, feed mechanism for one of said stops, means for connecting and disconnecting one of said stops with the cross-slide, a cylinder and piston one of which is connected with the cross-slide, and means for supplying fluid under pressure to said cylinder.

54. In a grinding-machine the combination of a cross-feed slide, a grinding-wheel spindle mounted thereon, two engaging stops for determining the position of the cross-slide, feed mechanism for operating one of said stops, means for connecting and disconnecting one of said stops with the cross-slide, a cylinder and piston one of which is connected with the cross-slide, means for supplying fluid under pressure to either end of the cylinder, and a valve under the control of the operator for controlling the supply of fluid to the cylinder.

55. In a grinding-machine the combination of a cross-feed slide, a grinding-wheel spindle mounted thereon, a feed-stop for determining the position of the cross-slide, a coöperating stop on the cross-slide, means under the control of the operator for clamping said latter stop to the slide, means for forcing said stops together, and means for operating the slide when the stop on the cross-slide is unclamped therefrom.

56. In a grinding-machine the combination of a cross-feed slide, a grinding-wheel spindle mounted thereon, a screw-shaft provided with a feed-stop, mechanism for operating said shaft, a stop on the cross-slide, and means for continually forcing said stops together.

57. In a grinding-machine the combination of a cross-feed slide, a grinding-wheel spindle mounted thereon, a screw-shaft provided with a feed-stop, feed mechanism for operating the shaft, a stop on the cross-slide for engaging the feed-stop, a piston and cylinder one of which is connected with the cross-slide, and means for supplying fluid under pressure to said cylinder.

58. In a grinding-machine the combination of a cross-feed slide, a grinding-wheel spindle mounted thereon, a feed-stop for determining the position of the cross-slide, a stop for engaging said feed-stop, a slide on which said stop is mounted, a clamp for connecting and disconnecting the stop-slide with the cross-slide, and means for forcing said cross-slide in either direction at the will of the operator.

EDWARD H. PARKS.
JOHN J. THACHER.

Witnesses:
J. H. THURSTON,
W. H. THURSTON.